United States Patent

[11] 3,588,145

| [72] | Inventor | Woodrow F. Thompson<br>Box 27, Forest, Miss. 39074 |
| --- | --- | --- |
| [21] | Appl. No. | 807,478 |
| [22] | Filed | Feb. 25, 1969 |
| [45] | Patented | June 28, 1971<br>Continuation-in-part of application Ser. No. 642,628, May 4, 1967, now abandoned, which is a continuation-in-part of application Ser. No. 612,988, Jan. 31, 1967, now abandoned. |

[54] TRAILER HITCH
26 Claims, 44 Drawing Figs.

[52] U.S. Cl. ................................................. 280/406, 280/446, 280/477, 280/489, 280/495, 280/512

[51] Int. Cl. ...................................................... B62d 53/00, B60d 1/06

[50] Field of Search .......................................... 280/406, 415, 446, 477, 489, 490, 432, 494, 495, 457, 511—513, 507

[56] References Cited

UNITED STATES PATENTS

| 2,070,884 | 2/1937 | Claus | 280/507X |
| --- | --- | --- | --- |
| 2,120,415 | 6/1938 | Meyer | 280/477 |
| 2,605,115 | 7/1952 | Smith | 280/513 |
| 2,685,454 | 8/1954 | Patchett | 280/461 |
| 2,700,554 | 1/1955 | Branstrator | 280/494 |
| 2,747,892 | 5/1956 | Jones | 280/495X |
| 2,772,893 | 12/1956 | Wettstein | 280/406 |
| 2,898,124 | 8/1959 | Bernard et al. | 280/406 |
| 3,036,845 | 5/1962 | Till | 280/432 |
| 3,061,334 | 10/1962 | Everett et al. | 280/513 |
| 3,129,957 | 4/1964 | Bernard et al. | 280/406 |
| 3,284,098 | 11/1966 | Worley | 280/406 |
| 3,297,340 | 1/1967 | Rendessy | 280/432 |
| 3,347,562 | 10/1967 | Bolyard | 280/406 |
| 3,400,948 | 9/1968 | Matson | 280/446(.3) |

FOREIGN PATENTS

| 648,623 | 8/1937 | Germany | (280/446) |
| --- | --- | --- | --- |
| 891,799 | 8/1953 | Germany | (280/477) |
| 47,654 | 1/1940 | Netherlands | (280/446) |

OTHER REFERENCES

Karnath, Kurt et al.; German printed application No. 1,169,786, Published May 6, 1964 Copy in: 280/495 (1 dwg; 2 pp. spec)

*Primary Examiner*—Leo Friaglia
*Attorney*—Sughrue, Rothwell, Mion, Zinn & Mac Peak ABSTRACT: A trailer hitch is provided with guide means to facilitate the automatic coupling thereof comprising a sloping guide plate secured to the vehicle portion of the trailer hitch for guiding the connecting element on the trailer portion into mating relationship with the connecting element secured to the vehicle as the vehicle backs into position. The trailer hitch is also provided with a safety load equalizing device and draft-stabilizing means as well as an antijacknife device.

INVENTOR
WOODROW F. THOMPSON

INVENTOR
WOODROW F. THOMPSON

BY Sughrue, Rothwell, Mion, Zinn & Macpeak
ATTORNEYS

INVENTOR
WOODROW F. THOMPSON

BY *Sughrue, Rothwell, Mion, Zinn & Macpeak*
ATTORNEYS

INVENTOR
WOODROW F. THOMPSON

INVENTOR
WOODROW F. THOMPSON 3,588,145

TRAILER HITCH

CROSS-REFERENCE TO RELATED APPLICATIONS

This application is a continuation-in-part of application Ser. No. 642,628, filed May 4, 1967 and now abandoned, which, in turn, is a continuation-in-part of application Ser. No. 612,988, filed Jan. 31, 1967 and now abandoned.

BACKGROUND OF THE INVENTION

1. Field of the Invention

This invention relates to a new and improved trailer hitch and more particularly to a hitch which selectively distributes the trailer load on the front and rear wheels of a towing vehicle and on the trailer wheels.

While the present hitch is of wide application and may be used to connect trailers of various types to commercial types of tractors, it is particularly useful in connecting two-wheeled trailers to usual types of passenger cars. The term two-wheeled trailers is intended to include trailers having dual or tandem wheels, in which the load is unbalanced so that a portion of the load is normally carried by the towing vehicle. The hitch may be used with smaller cargo trailers or the like, but is of greatest utility in connecting house trailers or other relatively heavy trailers which impose a substantial vertical load on the rear wheels and springs of the towing vehicle when connected by means of usual types of trailer hitches.

2. Prior Art

Although prior art devices have previously incorporated load-leveling mechanisms in combination with a trailer hitch, these trailer hitches utilized a pair of angularly related bars which were pivotally connected to the towing vehicle at two spaced-apart locations. Such a construction, although achieving the load-leveling feature for which they were intended, provided a serious drawback since the rods or bars were pulled out of line when turning. Such a push-pull action tended to cause a severe side pull or swaying action which seriously affected the operator's control of the towing vehicle. In accordance with the present invention, the load-leveling bar is centrally mounted on a bushing in vertical alignment with the ball and socket connection, thereby eliminating all detrimental side pull and swinging action. The present construction also enables the car and trailer to rock independently of each other, a feature which greatly enhances the operator's control over the towing vehicle when traveling over rough and uneven roads.

Prior art hitches have always utilized a ball and socket connection wherein the ball is mounted in an upstanding manner on the towing vehicle and the inverted socket is mounted on the trailer. With the smaller trailers, this did not present too serious a problem since the front end of the trailer having the socket thereon could always be lifted up and lowered down upon the ball on the towing vehicle. However, this was a physical impossibility with the heavier trailers and it was necessary to jack up the front end of the trailer with the socket at a height above the ground sufficient to clear the top of the ball on the towing vehicle. A very delicate maneuvering operation of the towing vehicle was then necessitated, often requiring a second person to direct the driver of the vehicle as he backed the ball directly under the socket on the trailer. The jack on the trailer was then subsequently lowered to bring the socket down into mating engagement with the ball. The present invention overcomes all of these disadvantages by providing the socket member on the towing vehicle and a depending ball arrangement on the trailer. The trailer would then be supported at the forward end to dispose the depending ball member at the proper height above the ground. By means of the unique guiding arrangement, a single person could easily back the towing vehicle up to the trailer and the ball would be guided upwardly and inwardly toward the socket arrangement in spite of any misalignment which might occur therebetween. Therefore, the present device provides a substantially automatic coupling arrangement which may be accomplished by a single person having average vehicle-handling ability.

Most prior art trailer hitches utilizing the ball- and socket-type coupling had the ball and the socket welded to the respective vehicles, thereby preventing a universal interchange of towing vehicles and trailer vehicles. In accordance with the present invention, the coupling member affixed to the trailer is provided with a multiplicity of adjustments, enabling the ready interchange of towing vehicles or trailers.

A major problem with prior art trailer devices resides in the fact that during a sudden operation, if the trailer is not exactly aligned with the towing vehicle, the trailer will tend to swing angularly with respect to the towing vehicle or "jacknife." In order to overcome this highly dangerous situation, the trailer hitch of the present invention incorporates braking means between the towing vehicle portion of the trailer hitch and the trailer portion of the trailer hitch to place a restraining force on the relative turning action between the towing vehicle and the trailer.

In accordance with the present invention, a trailer hitch is provided which is both economical to produce, readily usable on a wide variety of towing vehicles and trailers, easy to install and operate and providing an enhanced degree of safety on the road.

SUMMARY OF THE INVENTION

A trailer hitch comprising resilient drawbar means pivotally mounted on brackets adapted to be secured to the underside of the towing vehicle, first connecting means detachably secured to said drawbar means, second connecting means complementary to said first connecting means adapted to be secured to the forward end of the trailer and detachably connected to said first connecting means, load-leveling bar means pivotally secured to said first connecting means for movement about a vertical axis and extending over the forward end of said trailer, jack means adapted to be secured on the forward end of said trailer and operatively contacting said bar means to provide a variable lifting force on said bar means relative to said trailer, and brake means on said first and second connecting means cooperating to restrain relative turning movement between said first and second connecting means.

Other features of the invention will be pointed out in the following description and claims and illustrated in the accompanying drawings, which disclose, by way of example, the principles of the invention and the best mode which has been contemplated of applying those principles.

BRIEF DESCRIPTION OF THE DRAWINGS

FIG. 38 is a side elevational view of the drawbar in FIG. 37a;

DETAILED DESCRIPTION OF THE INVENTION

Figures 1, 2, 3, 4, 5:
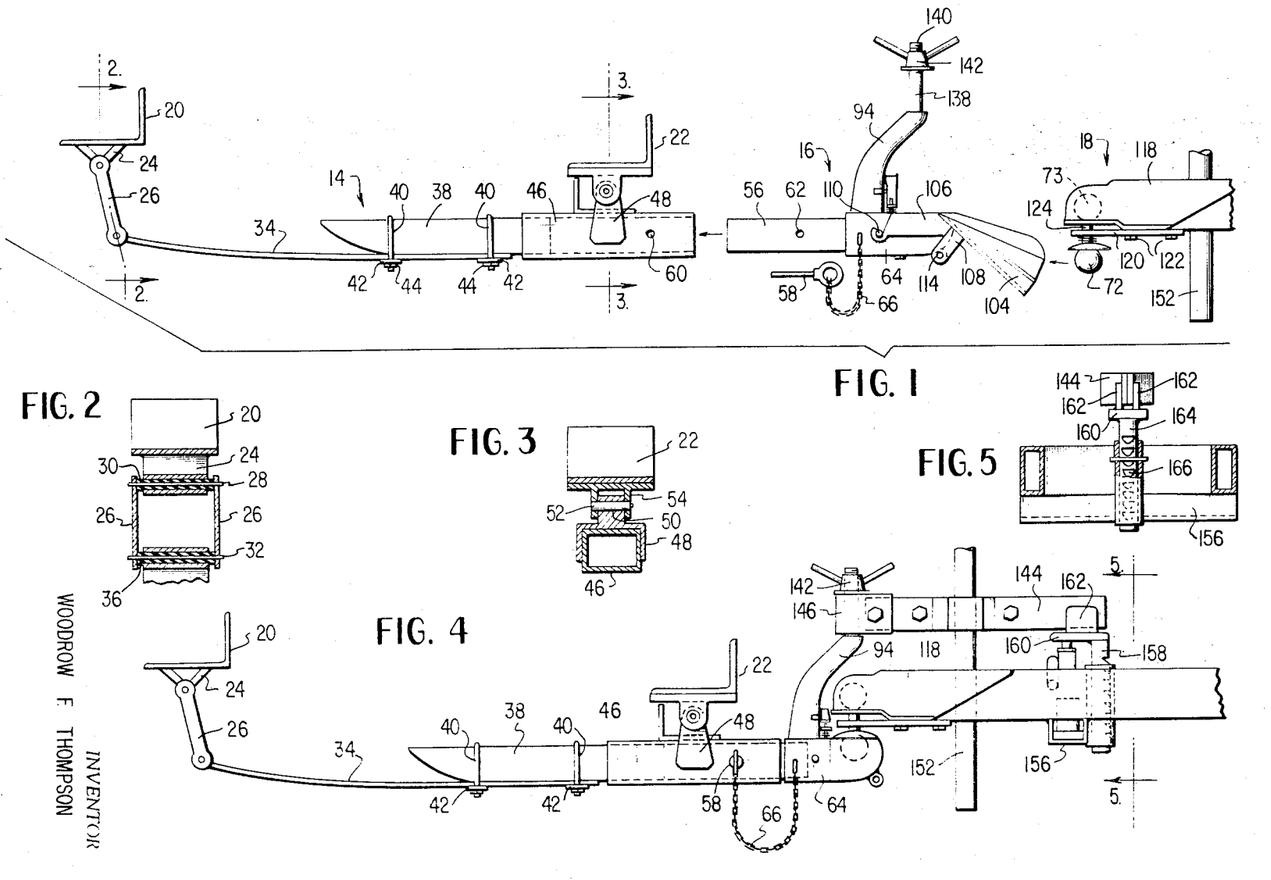
FIG. 1 is an exploded elevational view of the drawbar and coupling.
FIG. 2 is a sectional view taken along the line 2-2 in FIG. 1.
FIG. 3 is a sectional view taken along the line 3-3 in FIG. 1.
FIG. 4 is an elevational view of the drawbar, coupling and load-leveling device of the present invention in coupled condition.
FIG. 5 is a sectional view along the line 5-5 of FIG. 4.

Turning now to a detailed description of the drawings, FIG. 1 shows the drawbar arrangement 14, the socket portion 16 of the coupling and the ball portion 18 of the coupling in their separated condition. A pair of brackets 20 and 22 are provided for attaching the drawbar to the underside of a towing vehicle rearwardly of the rear axle of the vehicle. These brackets have been shown as angle irons but may be of any suitable construction depending upon the portion of the vehicle to which they are attached. The brackets may be secured by bolts, welding or other suitable means. The bracket 20 is provided with a depending portion 24. Spring-supporting shackle bars 26 are pivotally secured to the portion 24 by means of a pin 28 extending through a bushing 30. A second pin 32 pivotally supports the forward end of leaf spring 34 in a bushing 36. The leaf spring 34 is shown in FIG. 1 as a single spring but may be comprised of a plurality of springs, if necessary. The opposite end of the spring is secured to a tubular support member 38 by means of U-shaped bolts 40, crossbars 42 and nuts 44. The opposite end of the spring may also be installed inside the tubular support member 38 and secured therein by any suitable means. The rearward end of the tubular member 38 is secured within the complementary tubular housing 46 by welding or other suitable means. A U-shaped hanger member 48 is secured to the member 46 by welding or other suitable means and is provided with a transverse bore 50 for the reception of a pivot pin 52 secured to depending flanges 54 on the bracket 22.

It is contemplated that a kit comprised of the bracket members 20 and 22, the shackle member 26 and the U-shaped hanger member 48 may be installed as standard items on automobiles as they are delivered from the factory or may be offered to the customers as a separate optional package for installation on the car at the factory. The present drawbar or drawbars manufactured by other companies could then readily be attached to the brackets in a very quick and simple operation. The main feature of this kit would be that the brackets would be secured to the frame of the vehicle in a safe, efficient manner.

The cross-sectional configuration of the hollow, tubular housing member 46 may be of any desired shape but is preferably rectangular. The socket portion of the coupling is provided with a forwardly extending bar 56 which is complementary in cross section to the hollow, internal shape of the housing member 46. The bar 56 is adapted to slide into the housing member 46 and is pinned thereto by pin 58 which extends through holes 60 and 62 in the housing 46 and bar 56, respectively. The pin 58 may be attached to the socket housing 64 by means of a chain 66. The bar 56 may be formed integrally with the socket housing 64 or the socket housing 64 may be provided with a slot 68 into which the bar 56 may be adjustably inserted and secured by welding or other suitable means. The socket housing 64 is provided with upwardly opening socket 70 which is adapted to receive a depending ball member 72 which is secured to the trailer.

Figure 8:
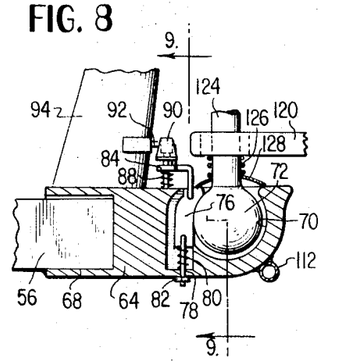
FIG. 8 is a detailed partial sectional view of the ball and socket connection in the latched condition.
Figure 9:
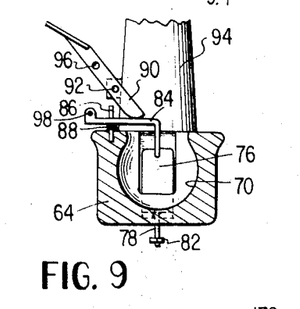
FIG. 9 is a sectional view along line 9-9 in FIG. 8 showing the ball and socket connection in the unlatched condition.

Latching means are provided for locking the ball 72 within the socket 70 and the details of this latching mechanism are best shown in FIGS. 8 and 9. A recess 74 is provided adjacent to and in communication with the socket opening 70. A locking member 76 is disposed in the recess 74 and is adapted to be moved into engagement with the ball 72 (FIG. 8) to lock the ball within the socket. The locking member 76 may be moved to the position shown in FIG. 9 to allow the ball 72 to be withdrawn from the socket 70. The locking member is pivotally mounted on a pin 78 which slidably extends through the bottom of the recess. A spring 80 surrounds the pin 78 between the locking member and the bottom of the recess to normally bias the locking member upwardly to the position shown in FIG. 8. A nut 82 is provided on the outer end of the pin 78 to limit the movement thereof. A lock operating member 84 is pivotally secured to the upper end of the licking member 76. The operating member 84 is slidably mounted on the pin 86 and a spring 88 surrounds the pin 86 between the operating member 84 and the frame 64 to normally bias the operating member 84 to the position shown in FIG. 8.

A second operating member 90 is pivotally mounted at 92 on an upstanding post 94. The lever 90 is provided with a hole 96 therethrough which may be aligned with the hole 98 in the first operating member 84 to enable a pin 100 or padlock to be inserted therethrough to prevent movement of the operating members 90 and 84 and the subsequent unlocking movement of the locking member 76. When the pin 100 is withdrawn from the operating members 90 and 84, the operating lever 90 may be pivoted clockwise about the pivot 92. The right-hand end of the lever 90, as viewed in FIGS. 8 and 9, will then come into contact with the operating member 84 to push the member 84 downwardly against the action of the spring 88 and the spring 80. The downward movement of the member 84 also causes the locking member 76 to move downwardly and due to the shape of the ball 72 the locking member 76 will pivot inwardly into the recess 74 allowing the ball 72 to be withdrawn from the socket 70.

To facilitate the automatic coupling of the ball and socket, the housing member 64 is provided with a shovel 104 or guard member which is detachably secured thereto. The shovel member 104 is provided with two pairs of attaching arms 106 and 108. The arms 106 extend along the opposite sides of the housing member 64 and hook underneath a pair of laterally protruding pins 110. The arms 108 extend downwardly along opposite sides of the housing member 64 and are provided with holes in the ends thereof which are adapted to align with the hollow, cylindrical pin guide member 112 which is secured to the bottom of the housing member 64. A pin 114 may then be inserted through the holes in the arms 108 and the pin guide 112 to secure the shovel member 104 to the housing member 64. The surface of the shovel member is generally concave and is provided with a plurality of guide ridges 116 which may be welded thereon or secured in any other suitable manner, and which are directed toward the socket. Thus, as the towing vehicle is maneuvered into position relative to the ball 72, the ball 72 will engage the shovel member and slide upwardly thereon guided by ridges 116 and the concave curvature of the shovel, into alignment with the socket 70, whereupon the ball 72 will drop into the socket 70. The weight of the trailer will be sufficient to enable the ball 72 to cam the locking member 76 downwardly and inwardly, allowing the ball to enter the socket 70. Once the ball is seated within the socket, the springs 80 and 88 will bias the locking member 76 and the operating member 84 into the position shown in FIG. 8. The pin 100 may be then inserted through the holes 96 and 98 in the operating members 90 and 84 to prevent further movement of the locking member. Once the ball is secured within the socket, the shovel can be detached from the housing 64 by merely withdrawing the pin 114. The pin 114 may be secured to the housing 64 by means of a chain or the like similar to the chain 66 securing the pin 58 to the housing 64. It is also contemplated that the shovel may be secured to the housing 64 by any other suitable means which will enable the shovel to be firmly secured to the housing when in use and readily detached therefrom when not in use.

The particular ball construction will vary depending upon whether the ball is being secured to a new trailer construction or if it is being secured to a trailer having a prior art type socket thereon. There are many trailers still in existence today which have the downwardly opening socket member secured to the trailer, usually by welding or some other permanent means. To facilitate a rapid conversion of the trailer socket to a trailer ball construction necessary for use with the trailer hitch of the present invention, the construction shown in FIG. 1 has been provided. A plate member 120 is secured to the underside of the conventional socket member 118 by means of bolts 122. The outer end of the plate member 120 is provided with two opposed shank members 124 having ball members 72 and 73 secured thereto. The ball 73 will extend upwardly into the conventional socket member 118 and the ball 72 will depend downwardly from the plate 120 for coupling with the socket member of the present invention. As seen in FIG. 9, the shank member 124 is surrounded by a flexible, resilient cap member 128 which is spring-biased downwardly toward the ball 72 by means of the spring 126 which surrounds the shank 124. When the ball member 72 is located within the socket member 70, the cover 128 will completely cover the socket to prevent the entry of dirt or moisture therein.

Figures 11, 12:
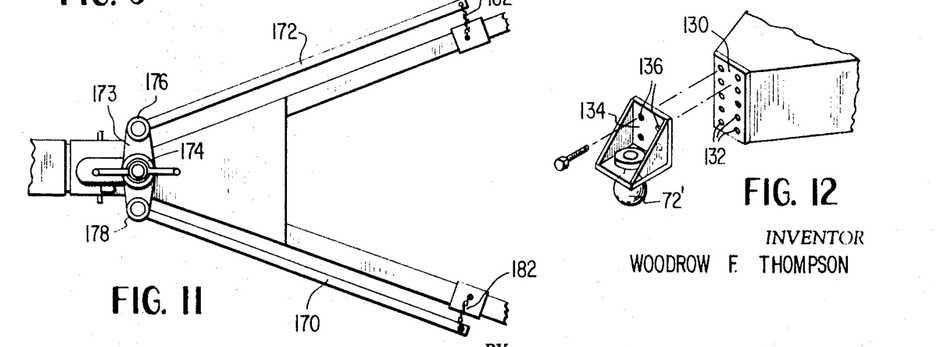
FIG. 11 is a top plan view of the device shown in FIG. 10.
FIG. 12 is a perspective view of a modified form of ball connector.

When the ball member is being applied to the new trailer construction or when it is feasible to remove the existing downwardly opening socket member from an old trailer, the construction shown in FIG. 12 is utilized. A plate member 130 having a plurality of bolt holes 132 therein is secured to the face of the trailer tongue by any suitable means, such as welding or the like. The ball member 72' is secured to an angle plate 134 which is provided with a plurality of attachment holes 136. The angle plate 134 may then be bolted to the plate 130 at any desired height. This adjustment feature enables the particular trailer to be used with a wide variety of towing vehicles by merely varying the position of the ball member 72'. It is also possible to mount a socket member to the trailer in the same manner.

Figure 6:
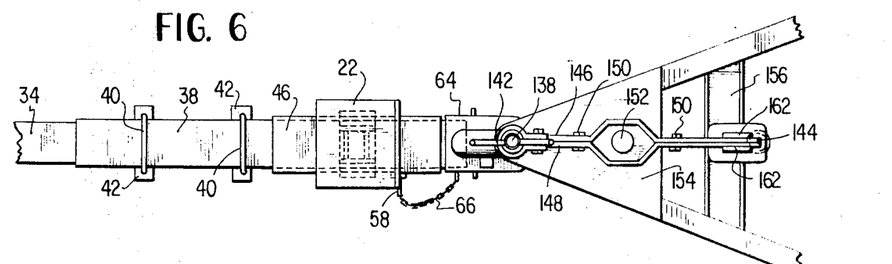
FIG. 6 is a top plan view of the device shown in FIG. 4.
Figure 7:
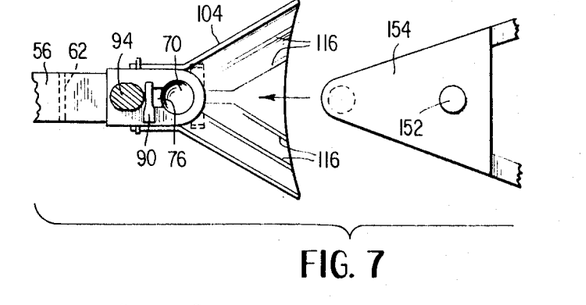
FIG. 7 is a top plan view, partially in section, of the ball and socket connection in its disconnected position.

The post member 94, as shown in FIGS. 1 and 4, is mounted on the upper surface of the housing member 64 and is provided with a vertical bushing post 138 which is in vertical alignment with the socket 70. The top portion of the bushing is threaded at 140 and a nut member 142 is threaded thereon. A load-leveling bar 144 is provided at one end with a strap 146 defining a cylindrical bore. The cylindrical bore fits over the bushing 138 and the load-leveling bar 144 is held thereon for pivotal movement by means of the nut 142. The bar itself is comprised of two strips of steel or similar material 146 and 148 (FIG. 6). These strips are held together by bolts 150 and each strip bows outwardly from the other strip intermediate the ends thereof to provide clearance for the standard support post 152 which is mounted through the tongue 154 of the trailer frame. It is also contemplated that the bar 144 could be constructed of a single piece of material provided with a hole for the bushing 138. It is also possible to relocate the support post 152. The trailer frame is also provided with a crossbar 156 upon which is mounted a jack 158 of any suitable construction. The upwardly directed pressure pad 160 of the jack is provided with a pair of upstanding flanges 162 which define a space wide enough to receive the end of the load-leveling bar 144. The jack 158 is provided with a vertically adjustable post 164 having a plurality of notches therein which enable the post to be locked at any desired height. The mechanism for raising and lowering the post 164 is conventional and it is not deemed necessary to disclose this mechanism in detail.

In reviewing the operation of the trailer hitch, as described in FIGS. 1 through 9, inclusive, it is seen that the drawbar portion 14 of the hitch is permanently secured to the underside of the towing vehicle. The socket portion 16 of the coupling may then be inserted into the hollow housing member 46 and secured therein by the insertion of the pin 58 through the aligned holes 60 and 62. The shovel or guide plate 104 may then be secured to the socket housing member 64 by hooking the arms 106 under the pins 110 and inserting the pin 114 through the aligned holes in the arms 108 and in the sleeve 112. The trailer is resting on its support stand 152 with the ball 72 arranged at a height level with the socket 70. The towing vehicle is then backed up to the trailer and the scoop or shovellike member 104 will guide the ball 172 upwardly into alignment with the socket 70 and the ball 72 will then drop into the socket and be automatically latched therein. To maintain the latch or lock plate 76 in the lock condition, the pin 100 will then be inserted through the aligned holes 96 and 98 in the latch operating members. The trailer stand 152 may then be raised to a position providing adequate road clearance by any suitable conventional means.

The nut 142 is then removed from the bushing 138 and the load-leveling bar 144 is placed on the bushing. The nut 142 is then threaded down to secure the load-leveling bar in place for pivotal movement about the bushing post 138. The opposite end of the load-leveling bar 144 is disposed between the upright flanges 162 on the upper end of the jack post and the jack post 164 is raised an amount necessary to provide a leveling of the towing vehicle and trailer. While the towing vehicle is pulling the trailer, the shovel 104 may be left in place or may be detached and stored elsewhere.

Figure 10:
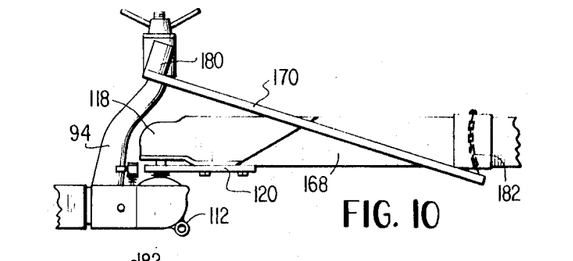
FIG. 10 is a side elevational view of a modified form of coupling and load-leveling device.

FIGS. 10 and 11 show a modification of the improved trailer hitch which adapts the trailer hitch for use with a pair of conventional wellhknown load-leveling bars which are presently in use on many trailers today. In this manner, the advantages of the present trailer hitch may be utilized without substantial modification of the existing hitch mechanism on older trailers. In accordance with the above-mentioned construction, the trailer frame 168 has a pair of load-leveling bars 170 and 172 which are disposed parallel to and outwardly of the converging sides of the trailer frame. A conversion plate 120 is mounted on a forward end of the downwardly opening socket member 118 in the same manner as shown and described above with respect to FIG. 1. The socket portion of the trailer hitch is identical to that shown and described with respect to FIG. 1 and the details will not be reiterated at this time. However, instead of utilizing the load-leveling bar 144 on the bushing post 138, a special adapter 173 is used which is comprised of a plate having a central bushing portion 174 adapted to fit over the bushing post 138. At the outer end of the plate 172, a pair of downwardly opening socket members 176 and 178 are formed which are adapted to receive the conventional upstanding lugs 180 on the forward ends of the load-leveling bars 170 and 172. The plate 172 is free to pivot about the bushing post 178, thereby eliminating the push-pull action on the load-leveling bars 170 and 172 when the towing vehicle and the trailer are in the process of turning. The opposite ends of the load-leveling bars are adjustably secured to the trailer by means of chains 182 in a conventional manner.

Figure 13:
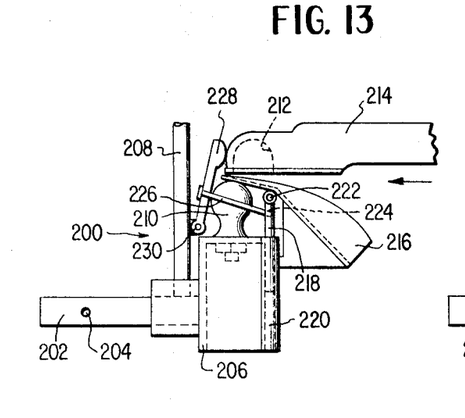
FIG. 13 is a side elevational view of a modified ball and socket showing the coupling guide means in the raised position just prior to unlatching.

As pointed out above, most trailers presently in existence today are provided with the inverted socket member adapted for coaction with an upstanding ball member on the draft bar of the towing vehicle. FIG. 13 is directed to a collapsible guide means which will assist in the coupling of a ball and socket connection when the inverted socket member is secured to the trailer member. The towing portion of the trailer hitch is generally indicated at 200 and is provided with a shank or adapter 202 which is similar to the member 56 in FIG. 1 for insertion into the hollow drawbar member 46. A hole 204 is provided in the shank 202 for cooperation with a suitable pin member which may be inserted through the hole 60 and the hole 204 to retain the towing portion of the hitch on the drawbar. A support for housing 206 is secured to the outer end of the shank member 202 by any suitable means such as welding or the like. A post member 208 is secured to the support housing 206 and extends vertically upwardly and is constructed similar to the post member 94 shown in FIG. 1 for cooperation with the load-leveling bar. An upstanding ball member 210 is mounted on the support 206 and is adapted to be inserted in the socket member 212 formed on the tongue 214 of the trailer member. A guide shovel or scoop 216 is movably mounted on the support 206 by means of pins 218 slidably mounted in cylindrical bosses 220 secured to the side of the support member 206. The pins 218 are pivotally connected to the scoop or shovel 216 by means of a pivotal connection 222. The pins 218 are formed with openings 224 for the reception of the ends of a U-shaped latch member 226. The latch member 226 is secured to a latch pin 228 which is pivotally mounted to the vertical post 208 at 230.

Figure 15:
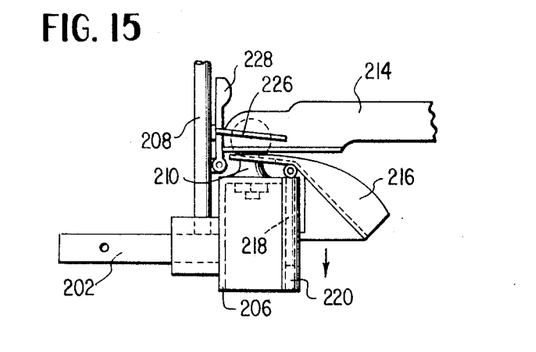
FIG. 15 is a side elevational view of the ball and socket connecting means shown in FIG. 13 but with the coupling guide means in the lowered unlatched position.

The scoop or shovel member 216 is provided with a curved, cutout portion 232 at its uppermost end adjacent the ball member 210 to provide the necessary clearance for the shovel to drop from its operative position as shown in FIG. 13 to its inoperative position as shown in FIG. 15. When it is desired to couple the trailer to the towing vehicle, the tongue of the trailer is supported at a distance from the ground substantially equal to the height of the ball member 210 from the ground. Upon backing of the towing vehicle toward the tongue of the trailer, the tongue portion 214 will engage the shovel 216 and the tongue will be guided upwardly along the contour of the shovel toward the position wherein the inverted socket 212 will be disposed over the ball member 210. When the socket 212 is substantially over the ball member 210 the forward end of the tongue member will contact the latch pin 228 causing it to pivot about its pivot point 230 toward the vertical post 208. The movement of the latch pin 228 toward the post 208 will cause the ends of the U-shaped latch member 226 to be withdrawn from the holes in the pins 218 thereby allowing the pins 218 to slide downwardly in the cylindrical bosses 220. In this manner, the shovel 216 is dropped downwardly to an inoperative position as shown in FIG. 15 and a socket member 212 will drop into operative connecting relation with the ball member 210.

Figure 16:
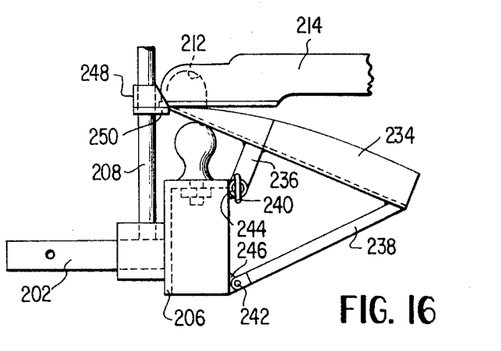
FIG. 16 is a side elevational view of a modified coupling guide means for a ball and socket connection.
Figure 17:
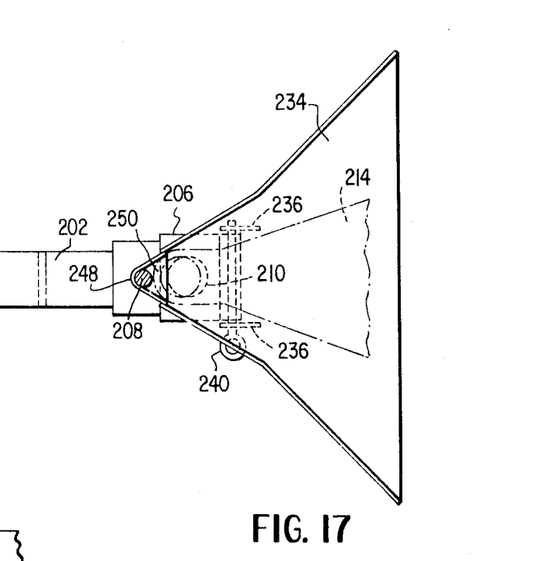
FIG. 17 is a top plan view of the device shown in FIG. 16.

A modified form of guide shovel for guiding the socket member on a trailer into operative engagement with the ball member on the towing vehicle is shown in FIGS. 16 and 17. In this embodiment, the support housing 206, the shank member 202, the vertical post 208 and the ball member 210 are identical to the structure shown in FIG. 13. The scoop or shovel 234 is provided with two depending legs 236 and 238. These legs are provided with holes in the ends thereof for the reception of pins 240 and 242, respectively, which extend through bosses 244 and 246 welded to the support housing 206. A loader member 248 is welded or otherwise secured to the vertical post 208 at a height above the top of the ball member 210. The forward end of the shovel 234 is disposed adjacent and level with a lip member 250 formed on the loader member 248.

In operation, when the towing vehicle is backed toward the trailer member, the forward end of the tongue 214 engages the shovel 234 and the tongue member 214 rides up the contours of the shovel member 234 toward the loader member 248. The towing vehicle continues its rearward movement until the forward end of the tongue 214 leaves the shovel 234 and rests upon the lip 250 of the loader member 248. One of the pins 240 or 242 may then be removed enabling the shovel 234 to pivot downwardly to an inoperative position. It is also contemplated that both pins 240 and 242 may be removed so that the guide shovel 234 may be completely removed from the support housing 206. During this pivoting or removal operation of the guide shovel 234, the trailer tongue will be completely supported on the lip 250 of the loader member 248. Once the guide shovel is removed, it is only necessary for the towing vehicle to be moved slightly forwardly allowing the tongue 214 to drop off the lip 250 enabling the inverted socket member to drop downwardly into the operative engagement with the upstanding ball member 210.

Figures 18, 19, 27:
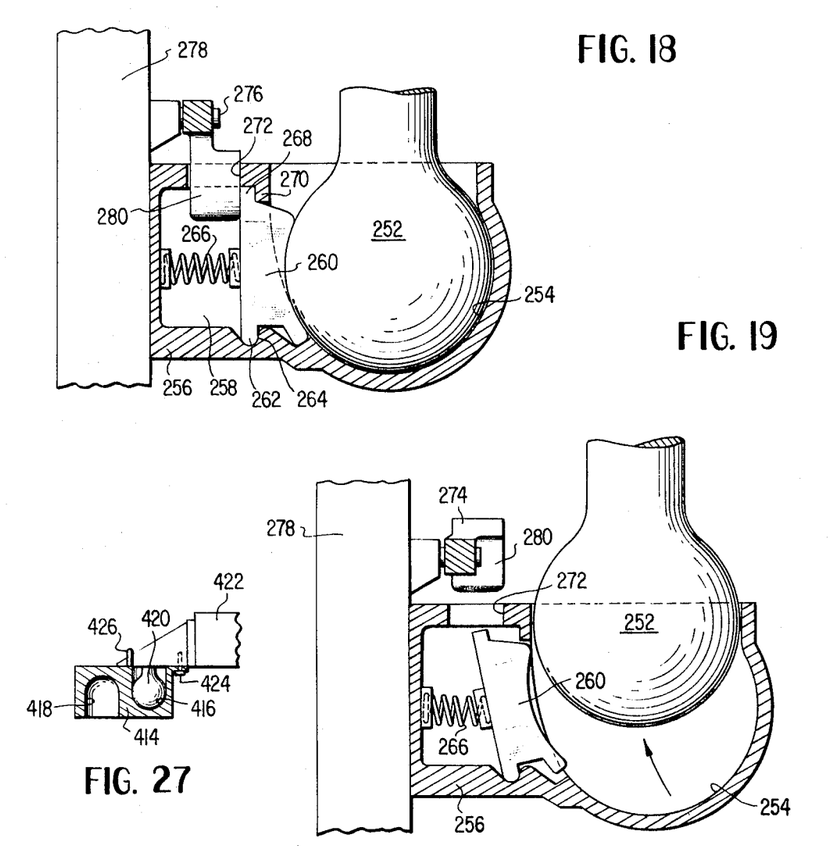
FIG. 18 is a partial sectional view of a modified form of latch means for holding a ball in a socket.
FIG. 19 is a side sectional view similar to FIG. 18 showing the ball member in the unlatched condition.
FIG. 27 is a sectional view of an adapter coupling device.
Figure 20:
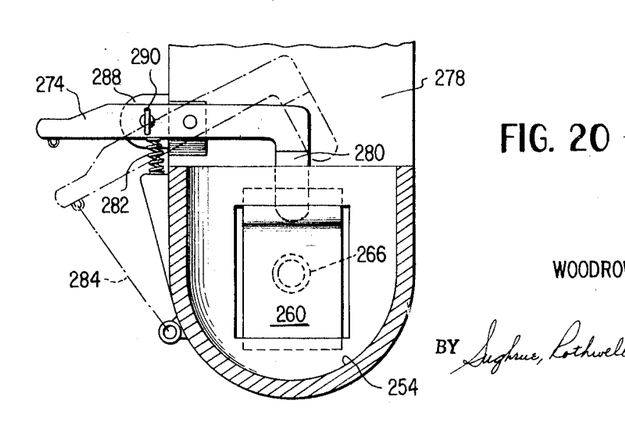
FIG. 20 is an end sectional view of the device shown in FIG. 19 with the ball member removed.

A simplified ball-latching arrangement for a ball socket connection similar to that shown in FIGS. 8 and 9 is illustrated in detail in FIGS. 18 through 20, inclusive. In FIG. 18, the ball member 252 is shown disposed in the socket 254. The support housing 256 is provided with a recess 258 for the reception of the latch member 260 which has a curved surface complementary to the curvature of the ball member 252. The latch member 260 is provided with a depending rounded lug portion 262 adapted to pivot in a recess 264 in the bottom of the recess 258. A spring member 266 is disposed in the recess 258 to bias the latch member 260 toward operative engagement with the ball member 252. The latch member 260 is provided with an upper lug 268 which is adapted to bear against a downwardly depending lug 270 which is integral with the housing 256 adjacent the entrance to the recess 258 to retain the latch member within said recess. The upper surface of the housing 256 is provided with an opening 272 which communicates with the inner recess 258. A lever member 274 is pivoted to the vertical post 278 and 276. The lever member 274 is provided with a depending blocking portion 280 which is adapted to extend through the opening 272 into engagement with the rear surface of the latch member 260 to hold the latch member 260 in the position shown in FIG. 18. When the lever member 274 is pivoted to its raised position as shown in FIG. 20 the lifting of the ball member 252 cams the latch member 260 into the recess 258 against the force of the spring 266 to enable the ball 252 to be withdrawn from the socket.

A spring 282 is provided between the support housing 256 and the lever 274 to bias the blocking portion 280 into blocking engagement with the latch 260. A latching member such as a string or a hooked rod may be secured to the outermost end of the lever 274 and is adapted to be connected to an eye member secured to the housing 256 to hold the blocking portion of the lever in its raised inoperative position against the action of the spring 282. When it is desired to lock the blocking portion 280 of the lever 274 in operative engagement with the latch member 260 to hold the ball 252 in the socket a pin 290 may be inserted to a hole in the lever arm 274 and a complementary hole in a boss secured to the side of the post 278. The contour of latch member which engages the ball member 252 extends sufficiently under the bottom portion of the ball so that when the ball is inserted into the socket, the weight of the ball member tends to bias the latch member 260 in a clockwise direction about its pivot point 262 to hold the latch in close-locking engagement with the upper surface of the ball. This action aids substantially in retaining the ball within the socket in a firm, secure and safe manner. It is also noted that a depending ball and upwardly opening socket arrangement is far superior to the usual downwardly opening socket and upwardly extending ball member, since the upwardly opening socket member forms a natural trap for lubrication to prevent the ball from rubbing and squeaking within the socket member. When the socket is downwardly opening it is impossible to retain any lubrication within the socket member thereby giving rise to a great deal of rubbing noise.

Figure 21:
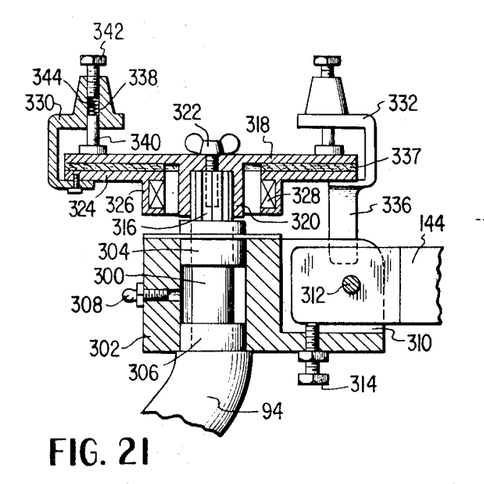
FIG. 21 is a sectional view of an electromagnetic friction brake means for the coupling.

FIG. 21 is directed to an antijacknife-braking arrangement suitable for engagement between a vertical post and load-leveling bar arrangement similar to that shown in FIG. 4. The vertical post 94 is provided with a reduced upper portion 300 and a load-leveling bar connector 302 is journaled on the reduced portion of 300 by means of bearings 304 and 306. A lubrication fitting 308 may be provided for lubricating the bearings 304 and 306. The connector member 302 is provided with an open groove 310 for the reception of the end of the load-leveling bar 144. A pin member 312 may be inserted through complementary holes in the connector member 302 and the load-leveling bar 144 to hold these members in assembled relationship. A limit screw 314 is disclosed in the bottom of the groove 310 to limit the relative pivoting movement between the load-leveling bar and the connector.

The uppermost end of the reduced portion 300 is formed with longitudinal splines 316 which may be machined therein, integrally cast thereon or formed on an annular hub member which is secured to the reduced portion by means of welding or the like. A friction plate 318 of circular configuration is formed with a downwardly depending annular boss of hub 320 having a plurality of axially directed internal splines for cooperation with the splines 316 to prevent rotation of the disc 318 relative to the vertical post 95. A suitable bolt or screw 322 is utilized to secure the disc 318 to the uppermost end of the reduced portion 300. An annular friction plate 324 is provided with an annular boss member 326 which surrounds the annular hub member 320. The annular boss member 326 carries an annular electromagnetic coil 328.

Figure 22:
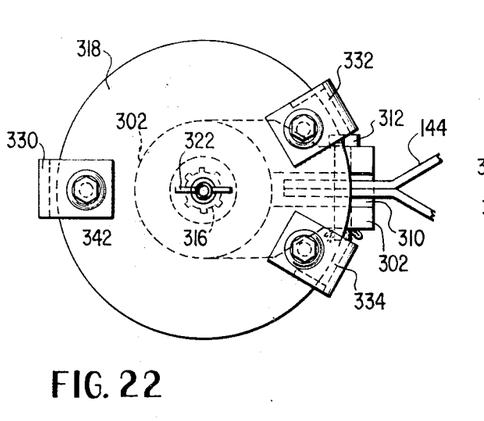
FIG. 22 is a top plan view of the embodiment shown in FIG. 21.

Three C-shaped bracket members are secured to the undersurface of the annular friction disc 324 by means of screws, welding or the like. The C-shaped bracket 330 is arranged approximately diametrically opposite the load-leveling bar 144. The other two C-shaped brackets 332 and 334 are disposed on opposite sides of the load-leveling bar 44 and each of these brackets is provided with a depending leg 336, one of which is shown in FIG. 21. The two depending legs 336 are disposed in close proximity to opposite sides of the load-leveling bar connector member 302 so that as the member 302 rotates about the reduced post portion 300, the annular friction disc 324 will rotate therewith. Since the friction disc 318 is stationary, when the coil 328 is energized the annular friction disc 318 is stationary, when the coil 328 is energized the annular friction disc will be drawn upwardly into engagement with the friction disc 318 to thereby hold the coupling member 302 stationary relative to the post 94. An annular disc of friction material 337 may be secured to either disc 318 or disc 324. The electromagnetic coil 328 may be connected to the electrical system of the towing vehicle by means of a circuit having a switch adapted to be mounted on the dashboard of the towing vehicle.

Each of the three C-shaped brackets is provided with a vertical bore 338 in the portion which overlies the friction disc 318. A plunger 340 is slidably mounted in each of the bores and extends downwardly through the bottom of the bore into engagement with the disc 318. A screw member 342 may be threaded into the upper portion of the bore and a spring member 344 may be disposed intermediate the screw member 342 at the plunger 340 to bias the plunger at 340 into engagement with the disc 318. This spring force tends to hold the disc 318 and the annular disc 324 in light frictional engagement when the electromagnetic coil 328 is deenergized.

Although three C-shaped brackets are shown, it is contemplated that more or less brackets could be utilized depending on the size of the particular device. It is also possible to have both legs 336 on the same bracket. Other suitable arrangements for holding the plates in light friction contact could also be utilized.

Figure 23:
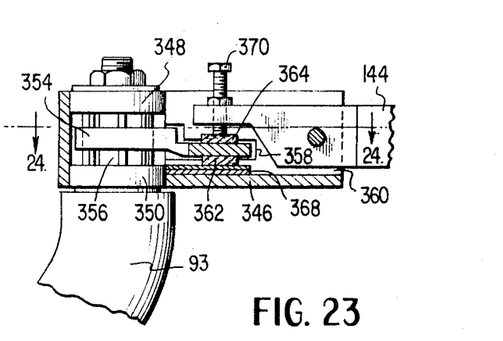
FIG. 23, is a view similar to FIG. 21 showing a modified form of braking means.
Figure 24:
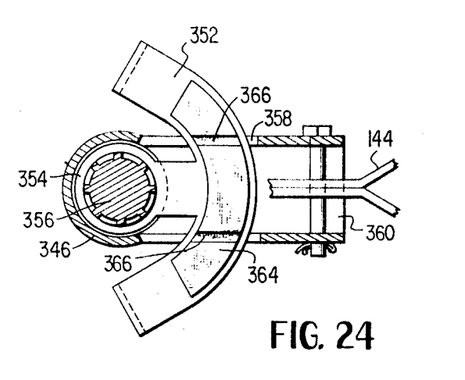
FIG. 24 is a top plan view, partially in section, of the device shown in FIG. 23.

In FIGS. 23 and 24 a modified form of friction brake means is shown wherein a connecting member 346 similar to the connecting member 302 in FIG. 21 is journaled about the reduced upper end of post 93 by means of bearings 348 and 350. Intermediate the two bearings the reduced portion of the post 93 is provided with vertically extending splines 356. A friction segment 352 is provided with a hub portion 354 having a splined bore therethrough which is complementary with the splines 356 on the upper end of the post 93 to hold the friction segment from rotating relative to the post 93. The connecting member 346 is provided with a channel-shaped groove 360 having longitudinal slots or openings 358 extending through the sides thereof for the reception of friction segment 352. An upper friction block 364 and a lower friction block 362 are disposed on opposite sides of the friction segment 352. These friction blocks also extend through the slots 358 and are retained against movement relative to the connecting member 346 by means of grooves 366 formed in the surfaces thereof remote from the friction segment 352. A plurality of shims 368 may be provided to adjust the spacing of the friction members from the bottom of the channel 360. An adjusting bolt 370 is threaded in the end of the load-leveling bar 144 and bears against the upper friction block 364. When the trailer is coupled to the towing vehicle the force applied to the load-leveling bar will be transmitted to the friction blocks and the friction segment to maintain these members in frictional engagement. This frictional engagement will not be sufficient to prevent turning of the towing vehicle relative to the trailer. During a sudden braking operation on the part of the towing vehicle, the force applied by the load-leveling bar to the friction blocks will be substantially increased thereby preventing any swinging movement of the trailer relative to the towing vehicle about the post 93.

Figure 25:
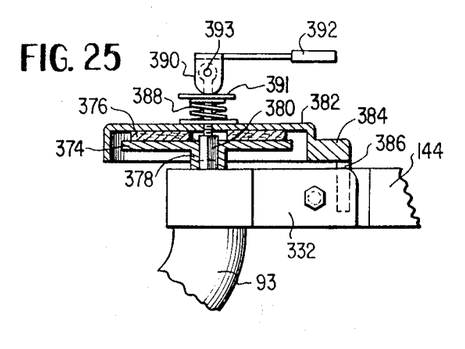
FIG. 25 is a sectional view similar to FIG. 21 but showing still another modified form of braking means.

Another embodiment of a friction-braking device is shown in FIG. 25 wherein the load-leveling bar 144 is connected to a connecting member 372 for pivotal movement about the reduced end of the post 93 in a manner similar to that shown in FIGS. 21 and 23. A friction disc 374 having friction material 376 secured to the upper surface thereof is provided with a boss member 378 having a bore therein with a configuration complementary to the irregular configuration of the post extension 380 to prevent relative turning movement therebetween. An inverted friction cup member 382 is mounted for rotation about the axis of the extension 380 to and is provided with an extension 384 having a pair of depending legs 386 which engage the opposite sides of the connecting member 332. In this manner the friction cup 382 partakes of the movement of the coupling member 332 about the post 93. The friction material 376 is disposed in frictional engagement with the flat disc line surface of the friction cup 382 which is biased by means of a spring 388. The force of the spring may be varied by means of the cam member 90 which bears against a washer 391. The cam member 90 may be pivoted about its pivot axis 393 by means of the handle member 392.

During ordinary towing operations the handle 392 will be turned to the position shown in FIG. 25 whereby the cam 390 will compress the spring member 388 to a greater extent. This increases the frictional force between the friction cup 382 which partakes of the movement of the trailer and the friction disc 374 which partakes of the movement of the towing vehicle. This frictional force will be sufficient to prevent undue swaying of the trailer with respect to the towing vehicle but will not hinder a turning movement of the vehicle and trailer around a corner. During maneuvering operations, such as parking or the like, where a greater degree of freedom between the trailer and the towing vehicle is required, the handle 392 may be pivoted to a vertical position thereby decreasing the compression of the spring 88. When the spring 388 expands the frictional force between the friction cup 382 and the friction disc 374 will be substantially reduced.

Figure 26:
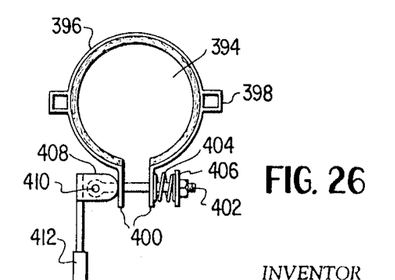
FIG. 26 is a top plan view of still a further modified form of braking means.
Figure 28:
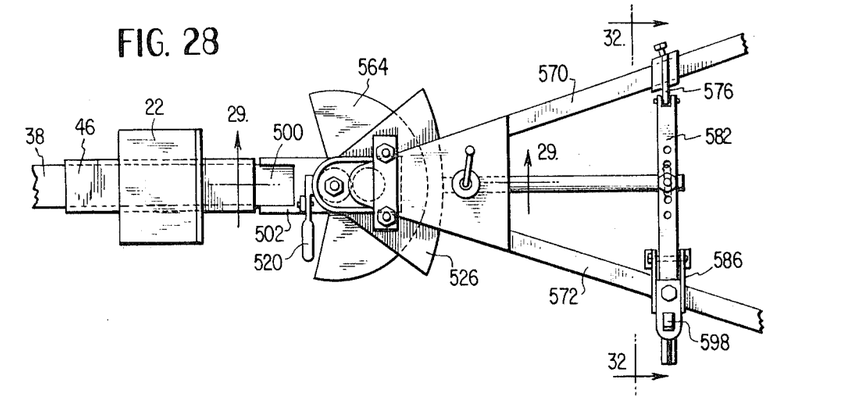
FIG. 28 is a top plan view of a still further modified coupling and load-leveling arrangement.

Still another modification of a braking device is shown in FIG. 26. In this embodiment, a friction cup similar to the cup 382 shown in FIG. 25 may be located at 394 and journaled for rotation about the spindle 93 to partake of the swinging movement of the load-leveling bar 144 about the post 93. A braking ring 396 surrounds the vertically disposed drumlike surface of the friction cup 382 and is held stationary relative to the post 94 by means of brackets 398 which may be secured to arms branching off the post 93 in any desired manner. The friction ring 396 is provided with a pair of spaced parallel ears 400 at each end thereof. A draw bolt 402 extends through the ears 400 and a spring member 404 bears against a washer 406 held on the end of the draw bolt 402 by means of a nut and one of the ears 400. On the other end of the draw bolt 402, a cam member 408 is pivoted at 410 and provided with an operating handle 412. The cam 408 is similar to the cam 390 in FIG. 25. When the cam member is shown in the position of FIG. 26, the ears 400 are moved closer to each other thereby compressing the ring 396 into frictional engagement with the drum portion of the friction cup 394. Due to the increased frictional force between the friction cam 394 and the friction ring 396 pivotal movement of the trailer with respect to the towing vehicle is greatly restrained. When it is desired to loosen the friction connection for increased maneuverability it is only necessary to pivot the handle member 412 90° to bring a more remote portion of the cam member 408 into engagement with the ear 400. In this situation, the spring 404 will still provide a light frictional engagement between the friction members.

One final feature of the present invention resides in the adapter which may be mounted on a trailer having the depending-type ball connection thereon. To provide the necessary interchangeability between towing vehicles and trailers it is necessary to have coupling members which are compatible or which may be made compatible. As mentioned previously, the most common-type connection is the upstanding ball member of the towing vehicle and the depending downwardly opening socket member on the trailer. Therefore, if a towing vehicle having an upstanding ball member were to be utilized for towing a trailer member having a depending ball member such as those shown in FIGS. 1 and 18 of the present invention, it would be necessary to have an adapter member which could be fastened to by the ball member so that the trailer and towing vehicle could be joined together. In FIG. 27 such an adapter is shown and is comprised of a block 414 having an upwardly opening socket 416 and a downwardly opening socket 418. The downwardly depending ball 420 on the trailer tongue 422 may be inserted into the upwardly extending socket 416 of the adapter member. The adapter member 414 may then be secured to the trailer tongue 422 by any suitable means, such as bolts 242 and clip 426 or any other suitable means. The clip 426 is an inverted U-shaped clip which is adapted to extend over the outermost end of the ball-supporting member. When the adapter 414 is secured to the trailer tongue the downwardly opening socket member 418 will be available for cooperation with a towing vehicle having an upstanding ball member thereon.

The coupling arrangement and load-leveling device shown in the embodiment illustrated in FIGS. 28 through 34 may be readily interchangeable with the coupling and load-leveling arrangement shown in FIGS. 1 to 4. That is, the jacking device for the load-leveling arrangement may be mounted on a standard trailer tongue similar to that shown in FIGS. 1 to 4 and a modified ball and socket adapter may readily be secured to the standard depending socket arrangement on the tongue of the trailer. Likewise, the socket portion of the coupling arrangement is designed to be mated with the drawbar arrangement 14 shown in FIG. 1 in the same manner in which the socket portion 16 of the coupling in FIG. 1 is secured to the drawbar arrangement 14.

Turning now to the details of the modified arrangement, a forwardly extending bar 500 is secured to the socket housing 502 by welding or other suitable means. As most clearly shown in FIG. 28, the connecting bar 500 extends into the tubular housing member 46 of the drawbar device which is adapted to be secured to the underside of the towing vehicle by means of a bracket 22. Any suitable retaining arrangement such as the pin 58 shown in FIG. 1 may be provided to secure the connecting bar 500 within the socket 46. The socket housing 502 provided with a ball-receiving recess 504 which communicates with a latch recess 506. A latch member 508 is disposed in the recess 506 and is adapted to be moved into engagement with the depending ball member 510 to lock the ball within the socket. The latching member 508 may be moved to a position away from the ball 510 to allow the ball 510 to be withdrawn from the socket 504. The latching member is pivotally mounted on a pin 512 which slidably extends through the bottom of the recess. A spring 514 surrounds the pin 512 between the latching member and the bottom of the recess to normally bias the latching member upwardly to the position shown in FIG. 29. An adjustable nut 516 is provided on the opposite end of the pin 512 to limit the movement thereof. A latch-operating member 518 is pivotally secured to the upper end of the latching member 508. The operating member 518 is, in turn, raised and lowered by means of a lever 520 pivoted on the upper surface of the socket housing 502. A dust cap 522 of rubber or other suitable material extends around the shank of the ball member 510 and is spring biased downwardly by means of a coil spring 524 to substantially cover the socket 504 to prevent the entry of foreign matter therein. Any suitable locking means (not shown) may be provided to immobilize the lever handle 520 to prevent unauthorized operation thereof to accomplish uncoupling of the trailer from the towing vehicle.

Figure 29:
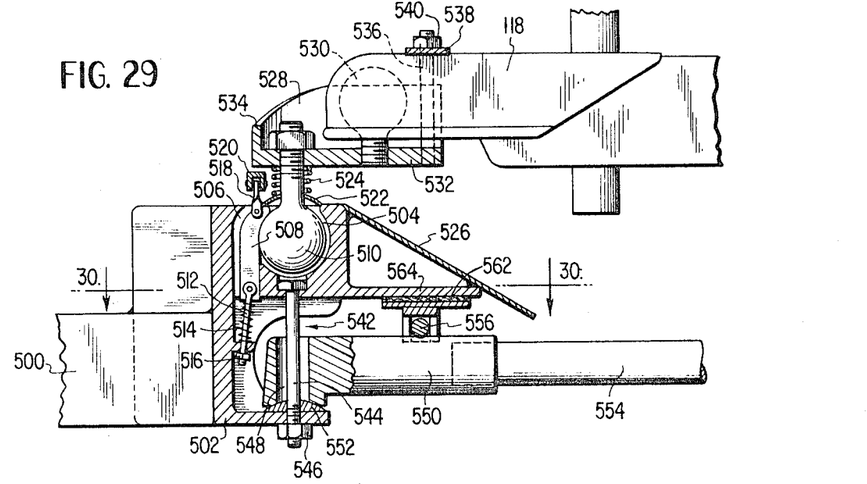
FIG. 29 is a sectional view along the line 29–29 in FIG. 28.
Figure 30:
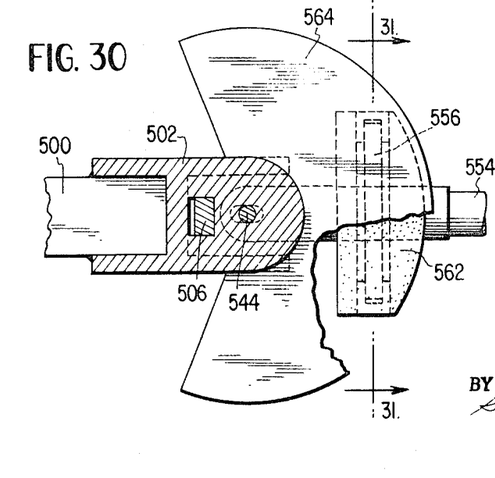
FIG. 30 is a sectional view, partly broken away, taken along the line 30–30 in FIG. 29.
Figure 31:
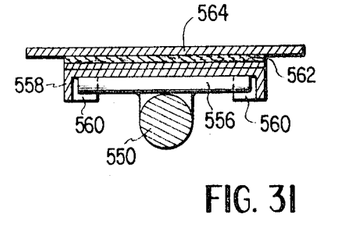
FIG. 31 is a sectional view taken along the line 31–31 in FIG. 30.

In the operation of the latching device, if the outermost end of the lever 520 is pressed upwardly, the opposite end of the lever 520 will push the connecting link 518 and the latching member 508 downwardly and forwardly into the latch socket 506. The forward movement of the latching member 508 into the recess 506 is caused by the configuration of the ball member 510 and with the latch member 508 in its forward and downward position the ball 510 may be withdrawn from the socket 504.

To facilitate the automatic coupling of the ball and socket, the housing member 502 is provided with a shovel 526 or guard member which may be welded to the housing in an inclined fashion as most clearly shown in FIG. 29. Thus, as the towing vehicle with the socket housing 502 secured thereto is backed toward the trailer, having the downwardly depending ball 510 secured thereto, the ball member 510 will contact the shovel 526. Continued rearward movement of the towing vehicle will cause the ball member 510 to ride upwardly along the shovel 526 until it reaches the top of the housing 502 whereupon the ball member 510 will be allowed to drop into the socket 504.

The particular ball construction will vary depending upon whether the ball is being secured to a new trailer construction or if it is being secured to a trailer having a prior art type socket thereon. There are many trailers still in existence today which have the downwardly opening socket member secured to the trailer, usually by welding or some other permanent means. To facilitate a rapid conversion of the trailer socket to a trailer ball construction necessary for use with the trailer hitch of the present invention, a modified conversion member 528 is provided whereby the conventional trailer socket may be provided with a depending ball structure of the type necessary for use with the trailer hitch of the present invention.

The conversion member 528 is provided with two oppositely directed ball members. The ball member 510 is threaded into an opening in the bottom plate 532 of the conversion member 528 and locked in place by means of a nut 534. An upstanding ball member 530 is also threaded into the bottom plate 532 of the conversion member 528 and extends in the opposite direction from the ball member 510. The upstanding ball member 530 is adapted to extend into the socket formed in the conventional socket member 118 and a pair of bolts 536 secured to the base portion 532 extend upwardly on opposite sides of the conventional socket member 188. A cross plate 538 is provided with a pair of holes through which the bolts 536 extend. A pair of nut members 540 are threaded on the end of the bolts 536 to clamp the conversion member 528 on the end of the conventional socket member 118.

A laterally extending recess 542 is provided in the socket housing 502 below the socket portion 504. A bolt 544 extends downwardly through the bottom of the socket 504 through the lateral recess 542 and through the bottom portion of the socket housing 502 where it is secured by means of a nut 546. The bolt 544 extends through an enlarged opening 548 formed in the end of the load-leveling bar 550. The end of the load-leveling bar 550 surrounding the enlarged opening 548 is provided with a spherical surface complementary to a part spherical pad member 552 to support the end of the load-leveling bar 550 for movement in a universal manner. The load-leveling bar 550 is provided with an extension 554 in the present construction for the ease of assembly, but it is also contemplated that the load-leveling bar could be constructed from a single piece of material.

A sway control means is provided between the socket housing 502 and the load-leveling bar in order to provide a higher degree of control between the towing vehicle and the trailer when operating under adverse conditions such as high winds or uneven road surfaces. A pivot rod 556 is rigidly secured transversely to the upper surface of the load-leveling bar 550. A brake member 558 having a pair of downwardly opening sockets 560 at either end thereof for the reception of the ends of the pivot rod 556 is mounted over the pivot rod 556 and is provided with a friction surface 562 which is mounted in frictional engagement with the underside of the fan-shaped flange 564 extending rearwardly from the socket housing 502. Thus, as the load-leveling bar 550 pivots about the bolt 544 upon relative turning movements between the towing vehicle and the trailer, the frictional contact between the brake lining 562 mounted for movement with the load-leveling bar and the flange 564 mounted for movement with the vehicle will provide the necessary sway control.

Figure 32:
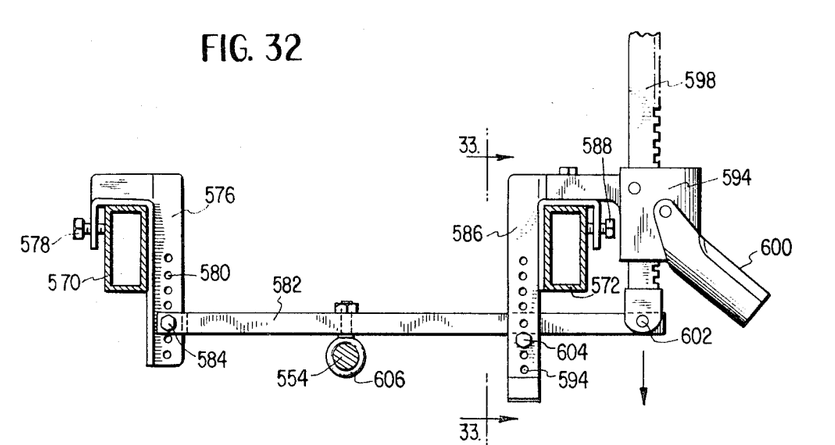
FIG. 32 is a sectional view taken along the line 32–32 in FIG. 28.
Figure 33:
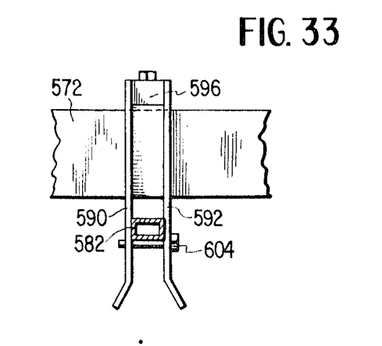
FIG. 33 is a sectional view taken along the line 33–33 in FIG. 32.
Figure 34:
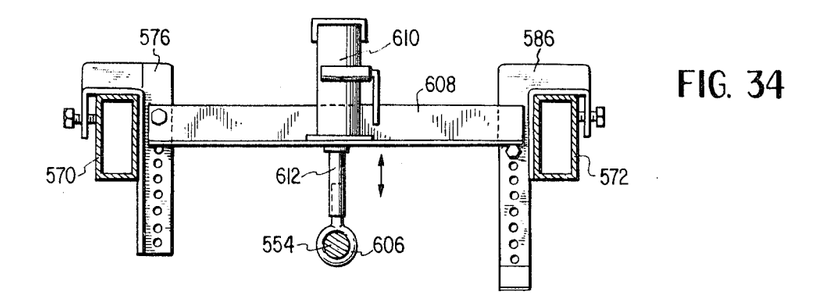
FIG. 34 is a view similar to FIG. 32 showing a modified form of load-leveling jacks.

Turning now to the apparatus adapted to be mounted on the trailer tongue for applying a lifting force to the load-leveling bar 550 in order to bring the brake lining 562 into frictional engagement with the flange 564, attention is directed to FIGS. 32 through 34, inclusive. The conventional trailer tongue is provided with a pair of forwardly extending beams 570 and 572 which are arranged in a V-shaped configuration with a conventional socket member 118 located at the apex thereof. Intermediate the apex and the trailer itself, a jack arrangement may be mounted for providing the necessary lifting force for the load-leveling bar 550. A C-shaped flange member 576 extends over the tongue rail 570 and is secured thereto by means of a setscrew 578. One leg of the C-shaped flange 576 is provided with a plurality of openings 580 arranged in vertical spaced relation. A crossbar 582 may be pivotally secured to a selected hole 580 by means of a suitable pivot pin or bolt 584.

A second C-shaped clamp 586 is secured to the tongue rail 572 by means of a setscrew 588. The clamp 586 is provided with a double flange as most clearly shown in FIG. 33 wherein each of the flanges 590 and 592 are provided with a plurality of aligned holes 594. A standard automobile jack 594 having the usual bumper-engaging portion 596 may be secured to the clamp 586 by either bolting or welding the bumper-engaging portion 596 thereto. Thus, upon operation of the handle 600 the post 598 will be moved upwardly or downwardly in a step-by-step relation. The lowermost end of the post 598 is pivotally secured to the crossbar 582 at 602. The crossbar 582 extends between the downwardly depending flanges 590 and 592 as most clearly shown in FIG. 33 and once the crossbar 582 is jacked upwardly to its desired position, a support bolt 604 may be inserted through suitable holes 594 to securely lock the crossbar in the desired position.

Intermediate the two clamps 576 and 586, a ring bolt 606 is secured to the crossbar 582. The end 554 of the load-leveling bar 550 extends through the ring bolt 606 in a loose manner.

As an alternative to the mechanical jacking arrangement, a hydraulic jacking arrangement is shown in FIG. 34 wherein a support bar 608 is bolted to one of the C-shaped clamp members for pivotal movement and supported by a support bolt extending through selected perforations in the flanges of the other C-shaped clamp. A conventional hydraulic jack 610 is mounted in the middle of the support bar 608 and end portion 554 of the load-leveling bar 550 extends therethrough in the same manner as the previous embodiment.

In order to level the load once the trailer has been coupled to the towing vehicle by means of the ball and socket connection described above, the end of the load-leveling bar 550 is inserted through the ring bolt 606 on the pivoted crossbar 582. By using either the mechanical or hydraulic jacking arrangement shown in FIGS. 32 and 34, respectively, the crossbar 582 is raised until it is disposed in a substantially horizontal position as shown in FIGS. 32 and 34. The support bolt 604 is then inserted through the parallel flanges of the clamp member 586 to safely support the crossbar in this position during the time that the trailer is being towed by the vehicle.

Figure 35:
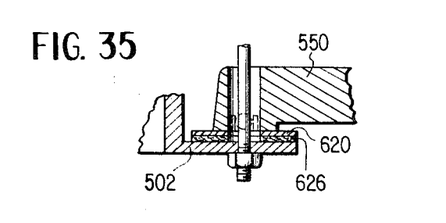
FIG. 35 is a detailed showing, partly in section, of a modified form of connection between the load-leveling bar and a vehicle-attached portion of the hitch.
Figure 36:
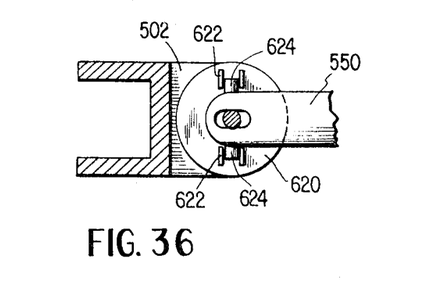
FIG. 36 is a top plan view, partly in section, of the modification shown in FIG. 35.

In lieu of the part-spherical pad 552 which guides the pivoting action of the load-leveling bar 550 about the bolt 552, a modified form involving frictional braking surfaces is illustrated in FIGS. 35 and 36. An upper frictional braking member 620 is in the form of a circular washer having two pairs of upstanding lugs 622 formed on the upper surface thereof. These upstanding lugs 622 are adapted to be disposed on opposite sides of ears 624 which extend outwardly from the side of the load-leveling bar 550 to prevent rotation of the plate 620 relative to the load-leveling bar 550. A frictional pad 626 such as a brake lining may be formed complementary in shape to the plate 620 and secured to the upper surface of the flange extending outwardly from the socket housing 502. In this manner additional braking means will be provided to assist the sway control function of the friction members 562 and 564.

In all of the modifications heretofore discussed, the pivoted drawbar arrangement shown in FIGS. 1—3 was used to mount the various types of vehicle-attached coupling means. However, in some automobiles, the use of such a drawbar mounting arrangement which would result in the actual coupling as well as a portion of the drawbar being mounted too close to the surface of the road. This is especially true where the gas tank is mounted directly under the trunk of the vehicle. Since the single drawbar arrangement shown in FIG. 1 must be centered with respect to the width of the vehicle, the drawbar would have to be slung underneath the gas tank thereby creating a hazard, especially when traveling over unimproved roads or rough terrain.

Figure 37A:
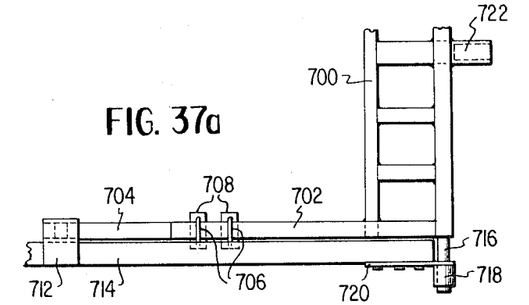
FIGS. 37a and 37b are split top plan views of two forms of a modified drawbar arrangement having two forwardly extending arms for straddling the gas tank of a vehicle.
Figure 37B:
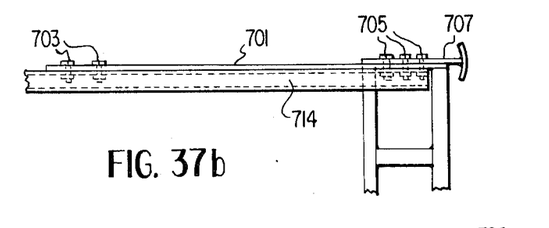

In order to obviate this difficulty, the drawbar may assume the modified form shown in FIG. 37a wherein a trusslike crossmember 700 which is provided with a rearwardly extending arm 702 at each end thereof. FIGS. 37a and 37b taken together show the overall arrangement of the truss-style drawbar with a rearwardly extending arm at each end. However, the details of the arm 702 in FIG. 37a and the mode of attachment differ from the details of the arm 701 in FIG. 37b. In each of these modifications the two rearwardly extending arms would be identical. The arm 702 in FIG. 37a is similar to the member 38 in FIG. 1 and a forwardly extending leaf spring 704, similar to leaf spring 34 in FIG. 1, is secured to arm 702 by means of a U-shaped bracket 706 and a cooperating apertured plate 708. The forward end of the spring 704 is pivotally secured to a link 710 which in turn is pivotally secured to a bracket member 712 which may be welded or otherwise suitably secured to the frame 714 of the vehicle.

A short stub shaft 716 extends from the end of the trusslike member 700 and is journaled for rotation in the hub 718 of a bracket member 720 which may be secured to the frame 714 by any suitable means such as welding, riveting or the like.

Figure 38:
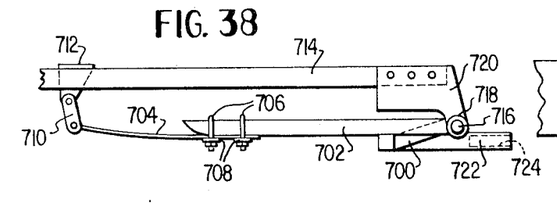

A hitch-connecting member 722 is located centrally of the trusslike member 700 and extends rearwardly therefrom. The extension 722 is provided with a socket 724 opening rearwardly for the reception of a complementary connecting bar such as the bar 56 shown in FIG. 1. As best seen in FIG. 38, the trusslike member 700 slopes upwardly and rearwardly so as to conform to the general configuration of the gas tank and allow the connecting member 722 to be disposed in a position no lower with respect to the vehicle than the bottom of the gas tank (not shown). The rearwardly extending arms 702 will straddle the opposite sides of the gas tank and the operation of the pivotal arrangement is identical to that described in FIG. 1 with respect to the single drawbar so as to transfer the load imposed by the weight of the trailer forwardly to a point on the frame of the vehicle intermediate the front and rear wheels. In this way the tendency for the rear portion of the towing vehicle to be depressed when connected to a relatively heavy traveler is eliminated since the load is distributed partially through the frame to the front wheels of the vehicle as well as the rear wheels.

In FIG. 37b, the truss frame 700 and hitch-connecting member (not shown) are identical to the truss 700 and member 722 in FIG. 37a. The rearwardly extending arm 701 is welded to the end of the truss frame 700 and is bolted at 703 to the vehicle frame 714. The rearward end of the arm 701 in the vicinity of the truss frame 700 is also bolted to the frame 714 at 705 by the same bolts which are ordinarily used to bolt the bumper bracket 707 to the frame 714. An identical arm (not shown) is provided on the other end of the truss frame 700 in the same manner.

Figure 14:
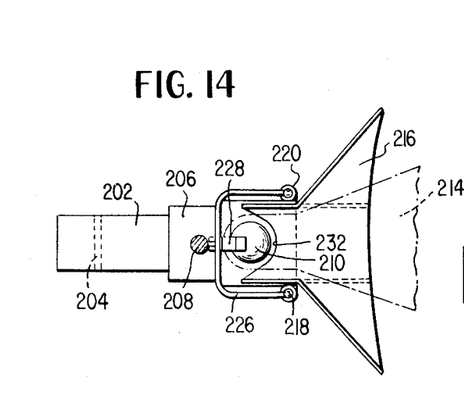
FIG. 14 is a top plan view of the device shown in FIG. 13 with the socket member shown in phantom lines.
Figure 39:
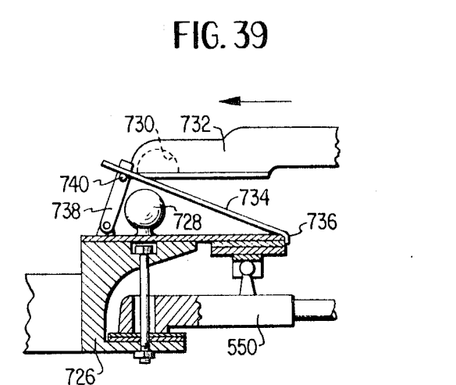
FIG. 39 is a side elevational view, partly in section, of a further modified guide arrangement for automatically connecting the socket secured to the trailer over the ball secured to the vehicle with the parts shown immediately prior to coupling.

A still further modified form of automatic connecting means for the trailer hitch is shown in FIG. 39 which is somewhat similar to the modification previously described with respect to FIGS. 13—15. In FIG. 39 the vehicle-connected portion of the trailer hitch 726 is provided with an upstanding ball 728 adapted to cooperate with a socket 730 formed in the forwardly extending portion 732 on the trailer tongue. A guide ramp or plate 734 is pivotally secured to the upper surface of the trailer hitch 726 at 736. Such a pivotal connection may either be a free-type pivot, that is with the plate 734 merely resting on the trailer hitch 726, or may be in the form of a pivot pin cooperating with both the trailer hitch 726 and the plate 734. The plate 734 is provided with a suitable cutout portion in the vicinity of the ball 728 similar to the cutout portion 232 shown in FIG. 14 to enable the plate to drop around the ball 728 into flat engagement with the upper surface of the hitch member 726.

Figure 40:
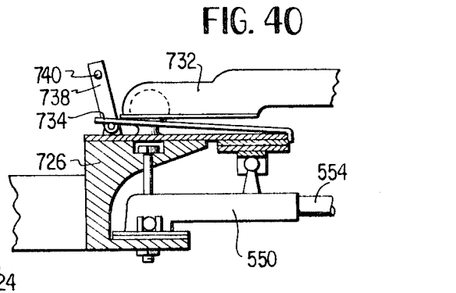
FIG. 40 is a view similar to FIG. 39 showing the ball and socket in coupled relation.

A support arm 738 is pivotally mounted on the trailer hitch portion 726 and is provided with suitable pin means 740 adapted to engage the plate 734 and hold the same in its elevated position as shown in FIG. 39. Thus, upon relative movement between the trailer and the towing vehicle the socket portion 732 of the trailer tongue will ride up the plate 734 and continued movement past the position shown in FIG. 39 will cause the counterclockwise pivotal movement of the support arm 738 to the position shown in FIG. 40 allowing the socket 730 to drop the over the ball 728. The guide plate 734 may then be removed or left as shown in FIG. 40 depending upon the manner of interconnection between the plate 734 and the trailer hitch portion 726. The pivotal arrangement for the load-leveling bar 550 and the antisway and braking arrangement for the drawbar are identical to the construction shown and described with respect to FIG. 35 and FIG. 29, respectively, and need not be discussed further at this time.

Figures 41, 42:
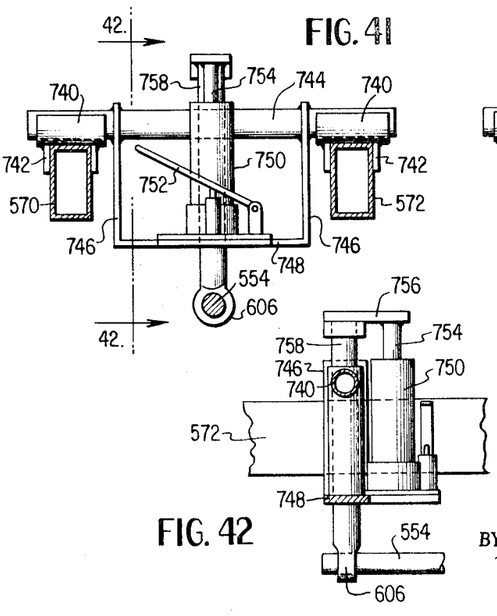
FIG. 41 is a side elevational view, partly in section, showing the jack arrangement on the tongue of trailer fork raising and lowering the load-leveling bar.
FIG. 42 is a sectional view taken along the line 42–42 in FIG. 41.

A modified form of jack device for raising and lowering the opposite end of the drawbar extension 554 is shown in FIG. 41 wherein the drawbar extension 554 extends through a ring member 606 similar to the manner previously described with respect to FIG. 34. In this arrangement a pair of U-shaped brackets 740 having depending ears 742 adapted to straddle the side frame member 570 and 572 of the trailer tongue. A transverse rod 744 is rotatably mounted in each of the U-shaped brackets 740 and is provided with a pair of depending support plates 746 having a platform 748 secured thereto and extending therebetween. A hydraulic jack 750 is mounted on the platform 748 and is provided with suitable operating means 752 to raise and lower the post 754. A top plate 756 is secured to the top of the post 754 and to the top of a connecting rod 758 to which the depending ring member 606 is secured by any suitable means. Thus, upon raising and lowering of the jack post 754 the ring member 607 will be raised and lowered to in turn raise and lower the end of the load-leveling bar 554.

Figure 43:
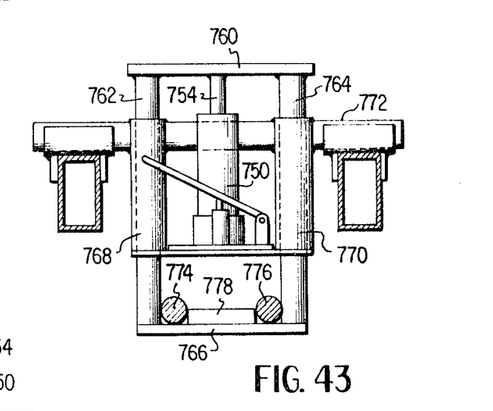
FIG. 43 is a view similar to FIG. 41 showing a modified form of jack arrangement for raising and lowering dual load-leveling bars.

The arrangement shown in FIG. 43 is somewhat similar to the arrangement shown in FIGS. 41 and 42 with the exception of the connecting rod 758 being replaced by a rectangular frame work for supporting two load-leveling bars for vertical movement. A transversely extending plate 760 is secured to the top of the jack post 754 and two depending side members 762 and 764 are secured to each end of the plate 760 at one end and to a lower plate 766 at the opposite end. The connecting rods 762 and 764 are journaled in suitable guide tubes 768 and 770 which in turn are integral with the rotatable support rod 772 which is journaled at each end in the U-shaped brackets on the trailer tongue. A pair of load-leveling bars 774 and 776 rest on the upper surface of the plate 760 and are separated by a spacer member 778. This type of jacking arrangement would be compatible with prior art trailer hitches utilizing two load-leveling bars instead of the single load-leveling bar generally preferred in the present application.

I claim:

1. A trailer hitch comprising drawbar means pivotally mounted on brackets adapted to be secured to a towing vehicle, first connecting means detachable secured to said drawbar means, said second connecting means adapted to be secured to the forward end of a trailer and detachable engaging said first connecting means, load-leveling bar means pivotally secured to said first connecting means for movement about a vertical axis and extending rearwardly toward said trailer, means adapted to be secured on the forward end of said trailer and operatively contacting said bar means to provide a variable lifting force on said bar means relative to said trailer, said drawbar means is comprised of leaf spring means, means for pivotally securing one end of said leaf spring means to first bracket means to first bracket means adapted to be rigidly secured to the underside of a towing vehicle, hollow, elongated housing means adapted to receive said first connecting means, second bracket means adapted to be rigidly secured to the underside of a towing vehicle rearwardly of said first bracket and means pivotally connected to said second bracket means interconnecting the other end of said leaf spring means and said housing.

2. A trailer hitch as set forth in claim 1 wherein said first connecting means comprises upwardly opening socket means and said second connecting means comprises downwardly depending ball means.

3. A trailer hitch as set forth in claim 2 further comprising post means secured on said first connecting means above and in vertical alignment with said socket means, means on said load-leveling bar means to pivotally mount said bar means on said post means whereby said ball means and said bar means will pivot about the same vertical axis.

4. A trailer hitch according to claim 3 wherein said bar means is comprised of a single bar pivotally mounted on said post means and wherein said means for providing the lifting force on said bar means is comprised of a jack means adapted to be mounted on the forward end of the trailer and having a vertically adjustable post adapted to engage the underside of said bar.

5. A trailer hitch according to claim 3 wherein said load-leveling bar means is comprised of a pair of load-leveling bars, plate means pivotally mounted on said post means centrally thereof and having a pair of oppositely directed portions, means for pivotally connecting each of said bars to one of said portions of said plate.

6. The trailer hitch according to claim 2 wherein said ball means is comprised of an adapter plate adapted to be secured to the underside of a conventional downwardly opening trailer attached socket member, at least one ball secured to and depending from said plate adjacent one end thereof in proximity to said socket member.

7. A trailer hitch as set forth in claim 2 wherein said ball means is comprised of a first plate having a plurality of vertically aligned holes therethrough adapted to be secured to the forward end of said trailer, a second plate having at least one attachment hole therethrough and having a downwardly depending ball secured thereto and means for securing said second plate to said first plate through said hole in said second plate and a selected hole in said first plate.

8. A trailer hitch according to claim 2 wherein said socket means is comprised of an upwardly open socket and a scoop-shaped guide means mounted on said socket means adjacent said socket to guide said ball means into said socket.

9. A trailer hitch according to claim 8 further comprising a latch means adapted to lock said ball means in said socket, said latch means comprising a locking member movably mounted in said socket for movement between a position blocking removal of said ball to a position allowing movement of said ball into and out of said socket, means for moving said locking member and means for locking said moving means.

10. A trailer hitch as set forth in claim 2 wherein said first connecting means is provided with a recess adjacent to and communicating with said upwardly opening socket means, latch means having a curved face adapted to extend partially over said ball means and partially under ball means pivotally mounted adjacent said ball means, spring means disposed in said recess for biasing said latch means in engagement with said ball means and blocking means adapted to be moved into engagement with the face of said latch means opposite said ball-engaging face to hold said latch means in engagement with said ball means.

11. A trailer hitch as set forth in claim 1 wherein said first connecting means is comprised of an upstanding ball member and said second connecting means is comprised of a downwardly opening socket means.

12. A trailer hitch according to claim 11 further comprising scoop-shaped guide means detachably secured to said first connecting means with the uppermost end thereof disposed adjacent said upstanding ball means, and loader means having a trailer tongue supporting surface mounted on said first connecting means forwardly of said ball means adjacent said scoop end.

13. A trailer hitch as set forth in claim 11 further comprising scoop-shaped guide means movably mounted on said first connecting means adjacent said upstanding ball means between a first position adjacent the top of said ball means and a second position adjacent the bottom of said ball means, latch means adapted to hold said guide means in said first position and latch operator means adapted to be contacted by said second connecting means when said socket means is in substantial vertical alignment with said ball means to release said latch means thereby allowing said socket means to drop downwardly onto said ball means.

14. A trailer hitch as set forth in claim 11 wherein said socket means is comprised of an adapter block adapted to be secured to the underside of a trailer tongue having a downwardly depending ball thereon, first upwardly opening socket means in said adapter block adapted to be disposed around said downwardly depending ball and second downwardly opening socket means disposed adjacent said first socket means for cooperation with an upstanding ball member on said first connecting means.

15. A trailer hitch as set forth in claim 2 wherein pivot means for said load-leveling bar means are provided on said first connecting means directly below and in vertical alignment with said socket means.

16. A trailer hitch as set forth in claim 15 further comprising complementary braking means mounted on said first connecting means and said load-leveling bar means to provide antisway control.

17. A trailer hitch as set forth in claim 16 wherein said braking means are comprised of a flange member secured to said first connecting means and extending laterally therefrom in overlying relation with respect to said load-leveling bar means and friction pad means secured to the upper portion of said load-leveling bar means for frictional engagement with the underside of flange means.

18. A trailer hitch as set forth in claim 16 wherein said braking means are comprised of friction means secured to said first connecting means about said pivot axis and complementary disc means secured for rotation about said axis with said load-leveling bar means.

19. A trailer hitch as set forth in claim 1 wherein said means for providing a variable lifting force on said load-leveling bar means is comprised of crossbar means secured to the forward end of said trailer and extending transversely of said load-leveling bar means, jack means secured to said crossbar means and vertically movable load-leveling bar supporting means gathered by said crossbar means and engaged by said jack means whereby operation of said jack means will impart a lifting force to said load-leveling bar means.

20. A trailer hitch as set forth in claim 19 wherein said crossbar means is secured to the forward end of said trailer for pivotal movement about an axis transverse to said load-leveling bar means whereby said jack means and said load-leveling bar supporting means may move relative to said forward end of said trailer to compensate for relative movement between said load-leveling bar means and the forward end of said trailer.

21. A trailer hitch as set forth in claim 1 wherein said means for providing a variable lifting force on said bar means is comprised of crossbar means adapted to be pivotally secured to one side of the forward end of said trailer and extending transversely of said load-leveling bar means, jack means secured to the forward end of said trailer having a vertically movable portion pivotally secured to the other end of said crossbar means and means secured to said crossbar means intermediate the ends thereof for connecting said crossbar means to said load-leveling bar means.

22. A trailer hitch as set forth in claim 1 wherein said means pivotally connected to said second bracket means for interconnecting the leaf spring means and said housing is comprised of elongated frame means extending transversely of the towing vehicle between the sides thereof, said hollow elongated housing means being mounted intermediate the ends of said frame means and extending rearwardly therefrom, and leaf spring means secured to each end of said frame means and extending forwardly therefrom to said means for pivotally securing said leaf spring means to said first bracket means.

23. A trailer hitch as set forth in claim 11 further comprising guide means movably mounted on said first connecting means adjacent said upstanding ball means between a first position adjacent the top of said ball means and a second position adjacent the bottom of said ball means, latch means adapted to hold said guide means in said first position, said latch means being pivotally mounted on said first connecting means and provided with an extension adapted to be contacted by said second connecting means when said socket means is in substantial vertical alignment with said ball means to pivot said latch means rearwardly thereby allowing said socket means to drop downwardly onto said ball means.

24. A drawbar for a trailer hitch comprising truss means adapted to be disposed beneath the rear of a vehicle adjacent the rear bumper thereof and extending substantially the full width of the vehicle, forwardly extending arm means rigidly secured to opposite ends of said truss means, means for rigidly securing each of said arms to the frame of said vehicle and connecting means secured to said truss means intermediate the ends thereof and extending rearwardly therefrom for detachably supporting a trailer hitch.

25. A drawbar as set forth in claim 24 wherein said truss means is comprised of a pair of spaced-apart parallel bars and a plurality of brace members extending between and rigidly secured to each of said bars.

26. A trailer hitch comprising drawbar means adapted to be secured to a towing vehicle, first connecting means detachably secured to said drawbar means, a second connecting means adapted to be secured to the forward end of a trailer and detachably engaging said first connecting means, vertical post means mounted on said first connecting means, load-leveling bar means pivotally mounted on said vertical post means for swinging movement in a horizontal plane, lifting means adapted to be mounted on said trailer engaging said load-leveling bar means, and antisway braking means including a first flat friction member nonrotatably mounted on said first connecting means adjacent said vertical post means and a second flat friction member operably connected to said load-leveling bar means and disposed in engagement with said first friction member for rotation about said vertical post means with said load-leveling bar means whereby upon operation of said lifting means said load-leveling bar means will press said friction members into engagement with each other.